United States Patent [19]

Burt et al.

[11] Patent Number: 5,325,449
[45] Date of Patent: Jun. 28, 1994

[54] METHOD FOR FUSING IMAGES AND APPARATUS THEREFOR

[75] Inventors: Peter J. Burt, Princeton; Gooitzen S. van der Wal, Hopewell Borough, Mercer County; Raymond J. Kolczynski, Hamilton Township, Mercer County; Rajesh Hingorani, West Windsor Township, Mercer County, all of N.J.

[73] Assignee: David Sarnoff Research Center, Inc., Princeton, N.J.

[21] Appl. No.: 884,098

[22] Filed: May 15, 1992

[51] Int. Cl.$^5$ ............................................. G06K 9/00
[52] U.S. Cl. ...................................... 382/56; 382/22; 382/41
[58] Field of Search ................... 382/41, 22, 49, 56; 364/715.02; 358/426, 133

[56] References Cited

U.S. PATENT DOCUMENTS

| | | | |
|---|---|---|---|
| 4,661,986 | 4/1987 | Adelson | 382/41 |
| 4,692,806 | 9/1987 | Anderson | 358/209 |
| 4,703,514 | 10/1987 | van der Wal | 382/41 |
| 5,140,416 | 8/1992 | Tinkler | 358/88 |

OTHER PUBLICATIONS

Richard Tinkler, "Multi-Spectral Image Fusion", Defence Helicopter, Autumn Supplement, pp. 8–10, 1992.
P. J. Burt and E. H. Adelson, "Merging Images Through Pattern Decomposition Proceeding of SPIE", vol. 575, pp. 173–181, 1985.
M. Pavel, J. Larimer, and A. Ahumade, "Sensor Fusion for Synthetic Vision", Proceedings AIAA Conference on Computing in Aerospace 8, Baltimore Oct. 1991.
A. Toet, "Hierarchical Image Fusion", Machine Vision and Applications, vol. 3 pp. Jan. 11, 1991.
O. Rioul and M. Veterli, "Wavelets and Signal Processing" IEEE SP Magazine, Oct. 1991.
S. Mallat, "A Theory For Multiresolution Signal Decomposition: The Wavelet Representation", IEE Trans. Pattern Analysis and Machine Intell. vol. 11 pp. 674–693, 1989.
P. J. Burt and W. A. Lee, "A Family of Pyramid Structure For Multiresolution Image Processing", David Sarnoff Research Center, Internal Communication, 1988.
P. Burt, "Fast Filter Transforms For Image Processing" in Multiresolution Image processing And Analysis, vol. 16 pp. 20–51, 1981.
P. Burt, "The Pyramid As A Structure For Efficient Computation" in Computer Graphics And Image Oressing, A. Resenfelf, Ed., Springer/Verlag, N.Y., 1984.
P. Burt & E. H. Adelson, "A Multiresolution Spline With Application To Image Mosaics" ACM Trans. on Graphics, vol. 2, pp. 217–236, 1983.

Primary Examiner—Leo H. Boudreau
Attorney, Agent, or Firm—W. J. Burke

[57] ABSTRACT

A method for fusing two or more source images to form a composite image with extended information content and apparatus for forming the composite image from the source images is disclosed. Each source image is decomposed into a number of source images of varying resolution. The decomposed source images are analyzed using directionally sensitive operators to generate a set of oriented basis functions characteristic of the information content of the original images. The oriented basis functions for the composite image are then selected from those of the different source images and the inverse of the decomposition performed to construct the composite image. Apparatus for fusing two or more source images to form a composite image is also disclosed.

44 Claims, 10 Drawing Sheets

METHOD FOR FUSING IMAGES AND APPARATUS THEREFOR

The invention relates to a method for fusing two or more source images to form a composite image with extended information content and apparatus for forming the composite image from the source images.

BACKGROUND OF THE INVENTION

Image fusion is a process that combines two or more source images to form a single composite image with extended information content. Typically images from different sensors, such as infra-red and visible cameras, computer aided tomography (CAT) and magnetic resonance imaging (MRI) systems, are combined to form the composite image. Multiple images of a given scene taken with different types of sensors, such as visible and infra-red cameras, or images taken with a given type of sensor and scene but under different imaging condition, such as with different scene illumination or camera focus may be combined. Image fusion is successful to the extent that: (1) the composite image retains all useful information from the source images, (2) the composite image does not contain any artifacts generated by the fusion process, and (3) the composite image looks natural, so that it can be readily interpreted through normal visual perception by humans or machines. The term useful information as determined by the user of the composite image determines which features of the different source images are selected for inclusion in the composite image.

The most direct approach to fusion is to align the source images, then sum, or average, across images at each pixel position. This and other pixel-based approaches often yield unsatisfactory results since individual source features appear in the composite with reduced contrast or appear jumbled as in a photographic double exposure.

Pattern selective image fusion tries to overcome these deficiencies by identifying salient features in the source images and preserving these features in the composite at full contrast. Each source image is first decomposed into a set of primitive pattern elements. A set of pattern elements for the composite image is then assembled by selecting salient patterns from the primitive pattern elements of the source images. Finally, the composite image is constructed from its set of primitive pattern elements.

Burt in "Fast Filter Transforms For Image Processing", in Multiresolution Image Processing And Analysis, volume 16, pages 20–51, 1981 and Anderson et al in U.S. Pat. No. 4,692,806 entitled "Image-Data Reduction Technique", incorporated herein by reference for its teaching on image decomposition technique, have disclosed an image decomposition technique in which an original comparatively high-resolution image comprised of a first number of pixels is processed to derive a wide field-of-view, low resolution image comprised of second number of pixels smaller than the first given number. The process for decomposing the image to produce lower resolution images is typically performed using a plurality of low-pass filters of differing bandwidth having a Gaussian roll-off. van der Wal in U.S. Pat. No. 4,703,514 entitled "Programmed Implementation Of Real-Time Multiresolution Signal Processing Apparatus", incorporated herein by reference, has disclosed a means for implementing the pyramid process for the analysis of images.

The Laplacian pyramid approach to image fusion is perhaps the best known pattern-selective method. P. Burt in Multiresolution Image Processing and Analysis, A. Rosenfeld, Ed., Springer Verlag, New York, 1984 first disclosed the use of image fusion techniques based on the Laplacian pyramid for binocular fusion in human vision. E. H. Adelson in U.S. Pat. No. 4,661,986 disclosed the use of the Laplacian technique for the construction of an image with an extended depth of field from a set of images taken with a fixed camera but with different focal settings. A. Toet in Machine Vision and Applications, volume 3 pages 1–11 (1990) has disclosed a modified Laplacian pyramid that has been used to combine visible and IR images for surveillance applications. More recently M. Pavel et al in Proceedings of the AIAA Conference on Computing in Aerospace, volume 8, Baltimore, October 1991 have disclosed a Laplacian pyramid for combining a camera image with graphically generated imagery as an aid to aircraft landing. Burt and Adelson in ACM Trans. on Graphics., volume 2, pages 217–236 (1983) and in the Proceeding of SPIE, volume 575, pages 173–181 (1985) have developed related Laplacian pyramid techniques to merge images into mosaics for a variety of applications In effect, a Laplacian transform is used to decompose each source image into regular arrays of Gaussian-like basis functions of many sizes. These patterns are sometimes referred to as basis functions of the pyramid transform, or as wavelets. The multiresolution pyramid of source images permits coarse features to be analyzed at low resolution and fine features to be analyzed at high resolution. Each sample value of a pyramid represents the amplitude associated with a corresponding basis function. In the Laplacian pyramid approach to fusion cited above, the combination process selects the most prominent of these patterns from the source images for inclusion in the fused image. The source pyramids are combined through selection on a sample by sample basis to form a composite pyramid. Current practice is to use a "choose max rule" in this selection; that is, at each sample location in the pyramid source image, the source image sample with the largest value is copied to become the corresponding sample in the composite pyramid. Finally, the composite image is recovered from the composite pyramid through an inverse Laplacian transform.

In the case of the Laplacian transform, the component patterns take the form of circularly symmetric Gaussian-like intensity functions. Component patterns of a given scale tend to have large amplitude where there are distinctive features in the image of about that scale. Most image patterns can be described as being made up of edge-like primitives. The edges in turn are represented within the pyramid by collections of components patterns.

While the Laplacian pyramid technique has been found to provide good results, sometimes visible artifacts are introduced into the composite image. These may occur, for example, along extended contours in the scene due to the fact that such higher level patterns are represented in the Laplacian pyramid rather indirectly. An intensity edge is represented in the Laplacian pyramid by Gaussian patterns at all scales with positive values on the lighter side of the edge, negative values on the darker, and zero at the location of the edge itself. If not all of these primitives survive the selection process, the contour is not completely rendered in the composite. An additional shortcoming is due to the fact that the Gaussian-like component patterns have non-zero mean values. Errors in the selection process lead to changes in the average image intensity within local regions of a scene. These artifacts are particularly noticeable when sequences of composite or fused images are displayed. The selection process is intrinsically binary, the basis function from one or the other source image is chosen. If the magnitude of the basis functions vary, for example because of noise in the image or sensor motion, the selection process may alternately select the basis functions from different source images. This leads to unduly perceptible artifacts such as flicker and crawlers.

Thus there is a need for improved methods of image fusion which overcome these shortcomings in the prior art and provide better image quality in a composite image formed by the image fusion process, particularly when sequences of composite images are displayed.

SUMMARY OF THE INVENTION

A method of the invention for forming a composite image from N source images where N is greater than one comprising the steps of decomposing each source image $I_N$ into a plurality L of sets of oriented component patterns $P_N(m, L)$; computing a saliency measure $S_N(m, L)$ for each component pattern $P_N(m, L)$; selecting component patterns from the component pattern sets $P_N(m, L)$ using the saliency measures $S_N(m, L)$ for each component pattern to form a set of oriented component patterns $P_c(m, L)$ of the composite image; and constructing the composite image from the set of oriented component pattens $P_c(m, L)$.

The invention is also an apparatus for forming a composite image from a plurality of source images comprising means for decomposing each source image into a plurality of sets of oriented component patterns; means for computing a saliency measure for each component pattern; means for selecting component patterns from the component pattern sets using the saliency measures for each component pattern to form a set of oriented component patterns of the composite image; and means for constructing the composite image from the set of oriented component patterns

DETAILED DESCRIPTION

Figure 1:
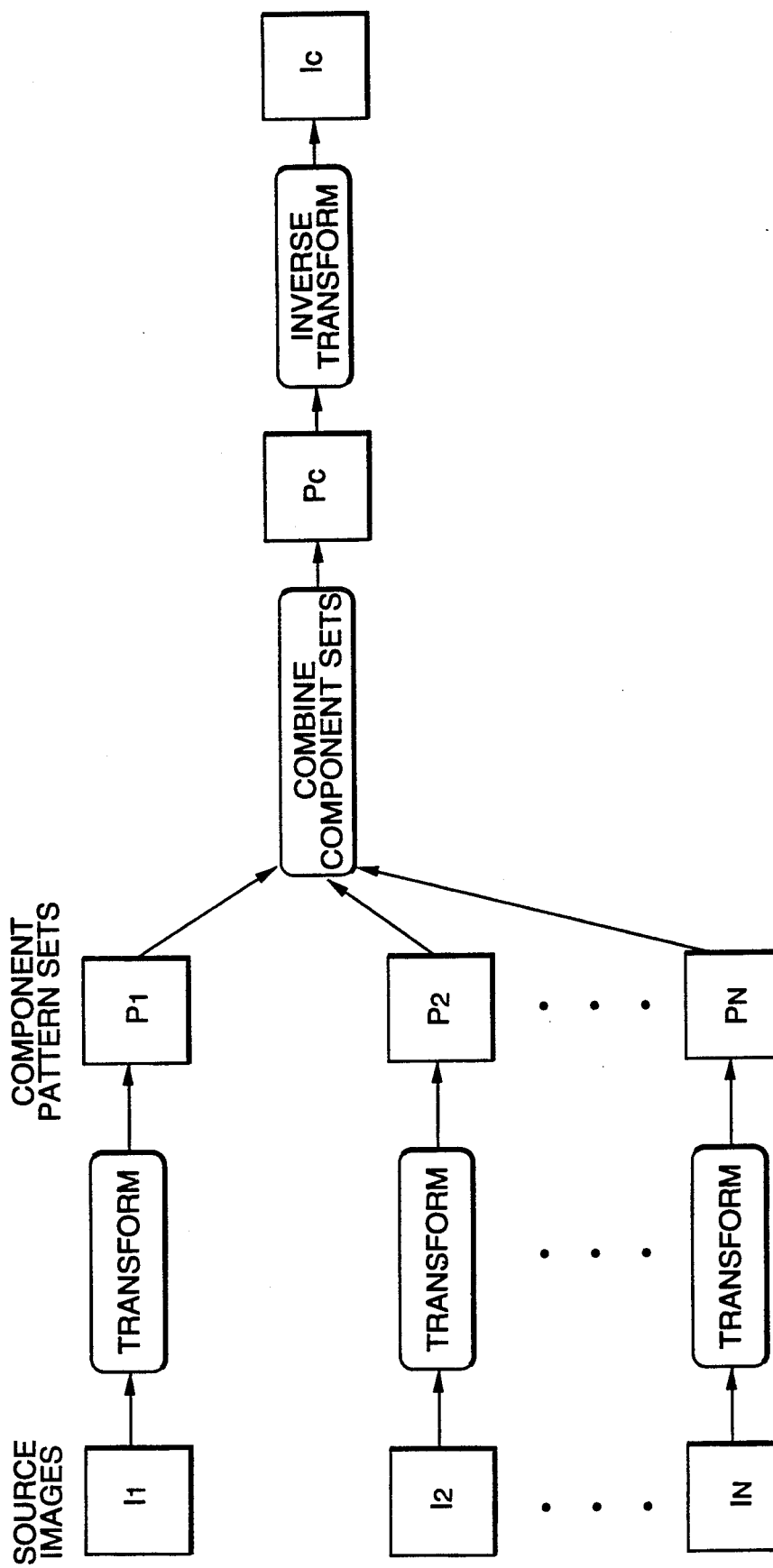
FIG. 1 is a flow chart showing a prior art method for pattern-based image fusion.

A flow chart for a prior art pattern-based image fusion is shown in FIG. 1. The source images are assumed to be aligned prior to undertaking the fusion steps. The fusion method comprises the steps of transforming each source image $I_n$ into a feature-based representation where each image $I_n$ is decomposed into a set of component patterns $P_n(m)$, where n=1, 2, ..., N, the number of source images, and m=1, 2, ..., M the number of patterns in the set for the $n^{th}$ source image. Features from the source images are combined to form a set of component patterns $P_c(m)$ representing the composite image assembled from patterns in the source image pattern sets. The composite image $I_c$ is then constructed from its component patterns $P_c(m)$.

The Laplacian pyramid method for image fusion can be described in this framework. Performing the Laplacian transform serves to decompose each source image into a set of circularly symmetric Gaussian-like component patterns. The pyramid is a regular decomposition into a fixed set of components. This set consists of patterns at different scales, represented by the pyramid levels, and different positions in the image, represented by the sample positions within the pyramid levels. Let $P_n(i,j,k)$ be the Laplacian value at location (i,j) in pyramid level k for image n. This value represents the amplitude of a corresponding component pattern $P_n(i,j,k)$ which is a Gaussian-like function.

Figure 2:
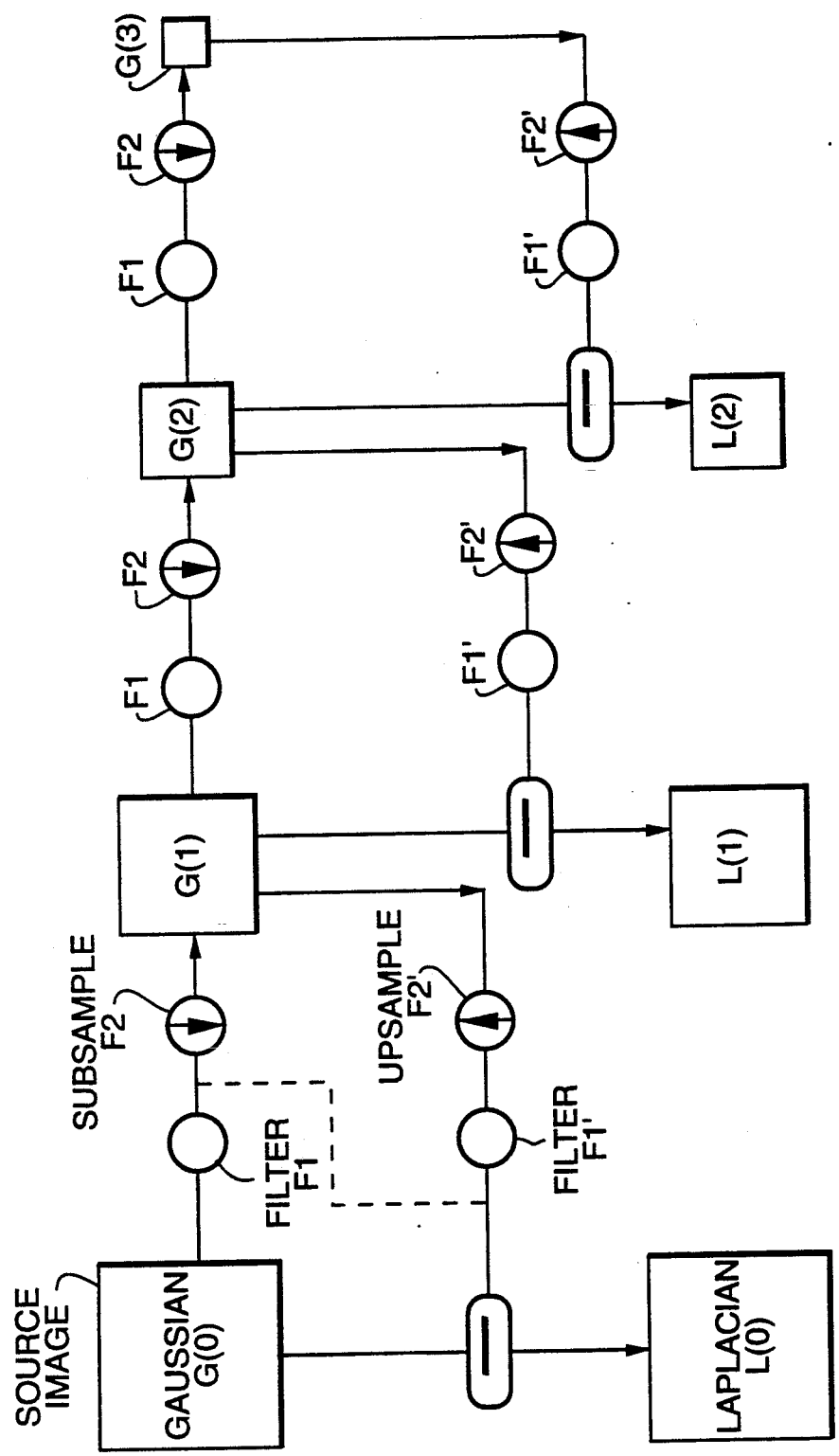
FIG. 2 diagrammatically illustrates a method for forming the Gaussian and Laplacian pyramids.
Figure 3:
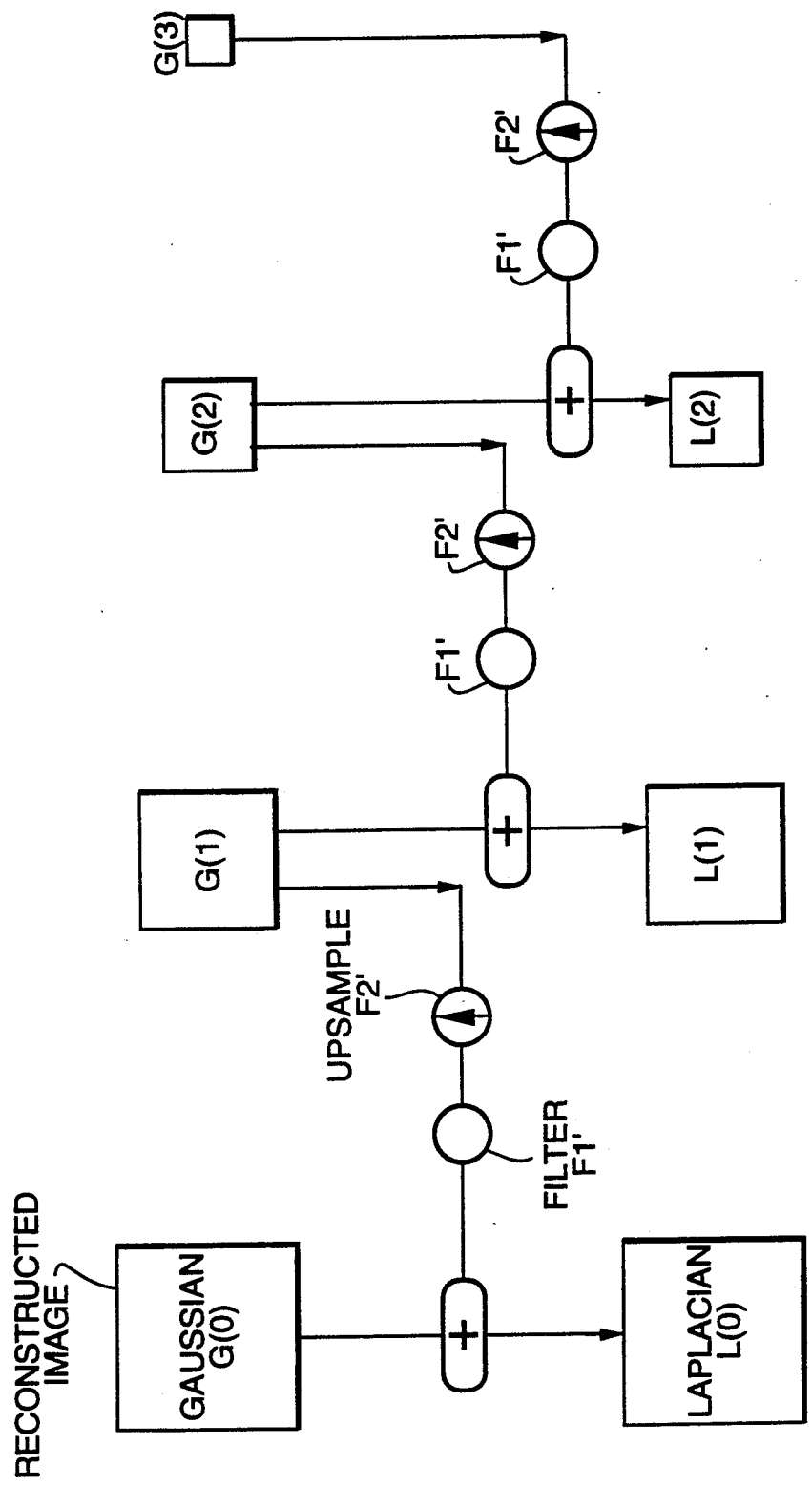
FIG. 3 diagrammatically illustrates a method for reconstructing the original image from the Laplacian pyramid.

A flow chart for the generation of the Gaussian and Laplacian pyramids of a source image is shown in FIG. 2. The Gaussian G(0) is the source image. The Gaussian G(0) is then filtered by F1, a low pass filter having a Gaussian rolloff, and subsampled by F2, to remove alternate pixels in each row and alternate rows, to form the first level Gaussian G(1). The lower level Gaussians G(n) are formed successively in the same way. The Laplacian L(n) corresponding to the Gaussian at each level of the pyramid is formed by restoring the subsampled data to the next lowest level of the Gaussian pyramid (by inserting zero-valued samples between the given samples F2' then applying an interpolation filter F1) and subtracting from the Gaussian of the given level. The Laplacian formed in this way is known as the Reduce-Expand (RE) Laplacian. Alternatively, the Laplacian can be formed without subsampling and reinterpolation as shown by the dotted line FIG. 2. This is called a filter-subtract-decimate (FSD) Laplacian. In FIG. 3 a method for reconstructing an image from the Laplacian pyramid is illustrated. In this method the Laplacians are interpolated and summed to reproduce the original image (i.e. the inverse RE Laplacian pyramid transform).

The step of combining component patterns, FIG. 1, uses the choose max rule; that is, the pyramid constructed for the composite image is formed on a sample basis from the source image Laplacian values:

$$L_c(i,j,k) = \max [L_1(i,j,k), L_2(i,j,k), \ldots, L_N(i,j,k)]$$

where the function max [ ] takes the value of that one of its arguments that has the maximum absolute value. The composite image $I_c$ is recovered from its Laplacian pyramid representation $P_c$ through an inverse pyramid transform such as that disclosed by Burt in "Fast Filter Transforms For Image Processing", in Multiresolution Image Processing And Analysis, volume 16, pages 20–51, 1981 and Anderson et al in U.S. Pat. No. 4,692,806.

Figure 4:
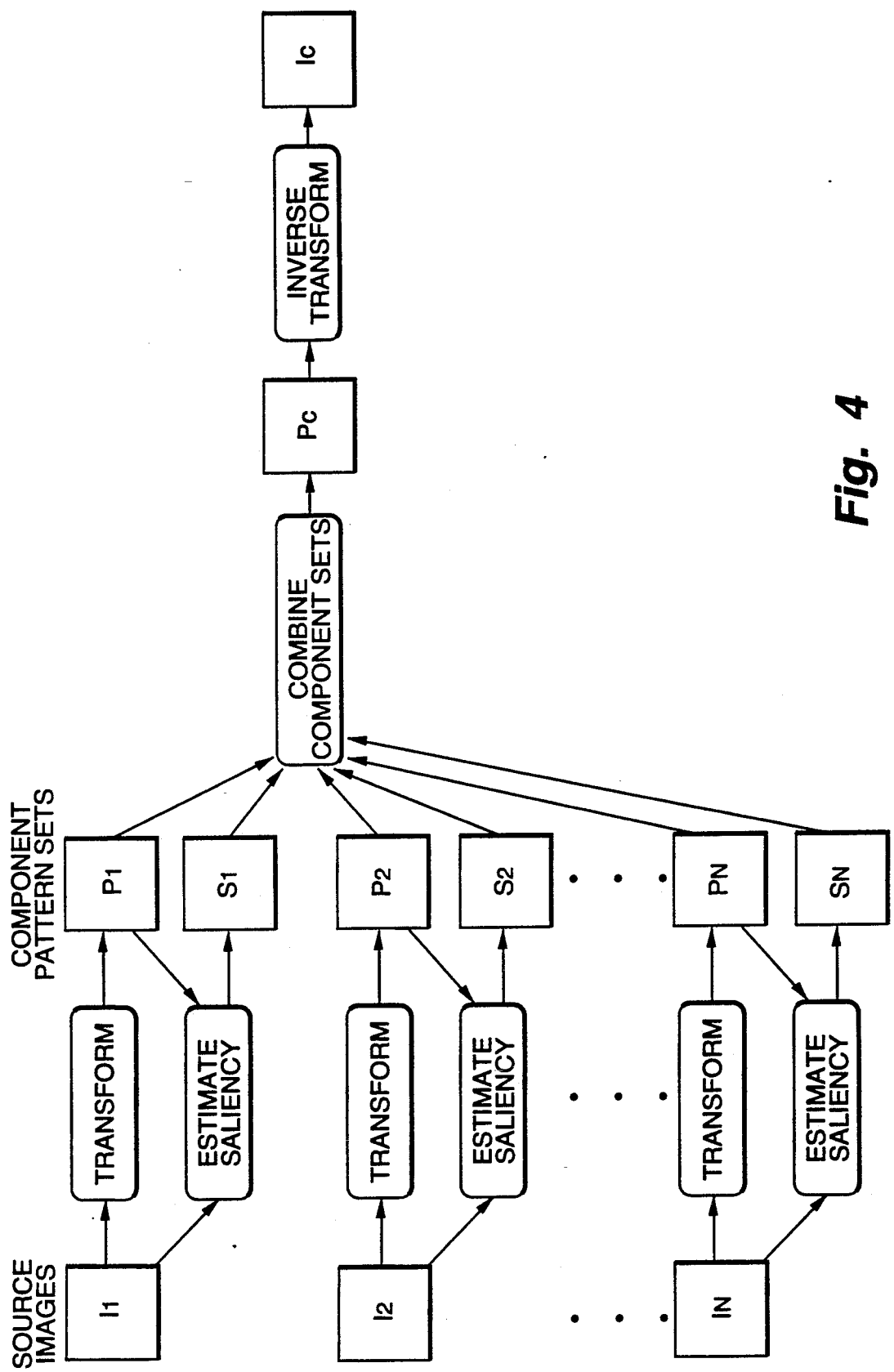
FIG. 4 diagrammatically illustrates a method for pattern-based image fusion of the invention.

A method of the invention for forming a composite image from a plurality of source images, as shown in FIG. 4, comprises the steps of transforming the source images into a feature-based representation by decomposing each source image $I_n$ into a set of component patterns $P_n(m)$ using a plurality of oriented functions; computing a saliency measure for each component pattern; combining the salient features from the source images by assembling patterns from the source image pattern sets $P_n(m)$ guided by the saliency measures $S_n(m)$ associated with the various source images; and constructing the composite image through an inverse transform from its component patterns $P_c(m)$. A saliency estimation process is applied individually to each set of component patterns $P_n(m)$ to determine a saliency measure $S_n(m)$ for each pattern. In general, saliency can be based directly on image data, $I_n$, and/or on the component pattern representation $P_n(m)$ and/or it can take into account information from other sources. The saliency measures may relate to perceptual distinctiveness of features in the source images, or to other criteria specific to the application for which fusion is being performed (e.g., targets of interest in surveillance).

The invention is a pattern selective method image fusion based upon the use of oriented functions (component patterns) to represent the image and, preferably, an oriented pyramid approach that overcomes the shortcomings in the prior art and provides significantly enhanced performance. Each source image is, preferably, decomposed into a plurality of images I of different resolution (the pyramid of images) and then decomposing each of these images into a plurality of sets of oriented component patterns. The oriented component patterns are, preferably, edge-like pattern elements of many scales and orientations using the oriented pyramid. The use of the oriented pyramid improves the retention of edge-like source image patterns in the composite image. A pyramid is used that has component patterns with zero (or near zero) mean value. This ensures that artifacts due to spurious inclusion or exclusion of component patterns are not unduly visible. Component patterns are, preferably, combined through a weighted average rather than a simple selection process. The most prominent of these patterns are selected for inclusion in the composite image at each scale and orientation. A local saliency analysis, where saliency may be based on the local edge energy (or other task-specific measure) in the source images, is performed on each source image to determine the weights used in the component combination. Selection is based on the saliency measures $S_n(m)$. The fused image $I_c$ is recovered from $P_c$ through an inverse pyramid transform.

This approach overcomes artifacts that have been observed in pixel-based fusion and in pattern-selective fusion within a Laplacian pyramid. Weights are obtained as a nonlinear sigmoid function of the saliency measures. Image fusion using the gradient pyramid has been found to provide excellent results even where image fusion based on the Laplacian pyramid introduces artifacts.

Several known oriented image transforms satisfy the requirement that the component patterns be oriented and have zero mean. The gradient pyramid has basis functions of many sizes but, unlike the Laplacian pyramid, these are oriented and have zero mean. The gradient pyramid's set of component patterns $P_n(m)$ can be represented as $P_n(i,j,k,l)$ where k indicates the pyramid level (or scale), l indicates the orientation, and i,j the index position in the k,l array. The gradient pyramid value $D_n(i,j,k,l)$ is the amplitude associated with the pattern $P_n(i,j,k,l)$. It can be shown that the gradient pyramid represents images in terms of gradient-of-Gaussian basis functions of many scales and orientations. One such basis function is associated with each sample in the pyramid. When these are scaled in amplitude by the sample value, and summed, the original image is recovered exactly. Scaling and summation are implicit in the inverse pyramid transform. It is to be understood that oriented operators other than the gradient can be used, including higher derivative operators, and that the operator can be applied to image features other than amplitude.

An alternative way of analyzing images is to use wavelet image representations. Wavelet image representations, as disclosed for example by Rioul et al in an article entitled "Wavelets And Signal Processing" in the IEEE Signal Processing Magazine, October, 1991, pages 14–38, are oriented spatial functions, linear combinations of which can be used to define an image. In the case of a wavelet representation, there are at least two sets of wavelets for different orientation. Typically three sets of wavelet basis functions, a set of horizontally oriented functions, a set of vertically oriented functions, and a linear combination functions derived from wavelets having right and left diagonal orientation. Once the sets of oriented basis functions which define the source images are obtained, a set of oriented basis functions for the composite is selected in the same way as for the basis functions generated using the gradient operators and the composite image is then reconstructed from them.

The gradient pyramid for image I is obtained by applying gradient operators to each level of its Gaussian pyramid G(n) as described in Appendix 1. Four such gradients are used for the horizontal, vertical, and orthogonal diagonal directions in the images, respectively. The four gradients are then fused using a selection criterion such as saliency to select the components to be used to form the gradient pyramid representation of the composite image. To reconstruct the composite image from its gradient pyramid representation, the gradient operators are applied a second time to form four oriented second derivative pyramids. These are summed at each level of the pyramid to form a standard Laplacian pyramid from which the composite image is reconstructed through the usual expand and add inverse Laplacian pyramid transform.

A pattern is salient if it carries information that is useful in interpreting the image. In general saliency will depend on the purpose for constructing the composite image and any measure of saliency will be task dependent. However, saliency generally increases with the amplitude of the elementary pattern. Let $S_n(i,j,k,l)$ be the saliency value corresponding to $P_n(i,j,k,l)$. A saliency measure that increases with the prominence of a component pattern can be indicated by its amplitude $$S_n(i,j,k,l) = |D_n(i,j,k,l)|.$$

Here $D_n(i,j,k,l)$ is the amplitude associated with the pattern $P_n(i,j,k,l)$ at position (ij) of gradient pyramid level k and orientation l. Alternatively, it can be indicated by the prominence of that component and other components within a local neighborhood. This neighborhood is indicated by a weighting function w(i',j'):

$$S_n(i,j,k,l) = [S_{i'j'} w(i',j') D_n(i-i',j-j',k,l)^2]^{(\frac{1}{2})}$$

Typically the neighborhood used are the component patterns for the 3×3 array of nearest components to the particular component of interest or the 3×3 array of picture elements surrounding the picture element of interest, depending upon the way the components are indexed.

Another alternative measure bases salience on the occurrence of specific patterns, such as targets in the image. For example, S may be related to correlation of the source image with a filter matched to the target pattern at each sample position.

The gradient pyramid for the composite image $I_c$ is obtained by selecting components from the source pyramid basis functions $P_n$ for each set of oriented functions. Selection is repeated at each sample position based on the saliency measure. The selection rule commonly used in current practice is "choose max", that is, select that source image sample that has the greatest amplitude. However a "soft switch" is preferable to strict selection; that is, when selection is between two component patterns that have quite different saliency, then the one with the larger saliency is chosen, but when selection is between components that have comparable saliency, then the composite sample value is taken to be the weighted average of the source samples.

The combination process is then one in which the amplitude of the combined pattern element is computed as a weighted average of the amplitudes of the source pattern elements for each orientation l.

$$D_c(i,j,k,l) = \{S_n W_n(i,j,k,l) D_n(i,j,k,l)\} / \{S_n W_n(i,j,k,l)\}$$

The weights used in this average are based on relative saliency measures over the source image. Weights are defined such that image components with higher saliency get disproportionately higher weight. As an example, let A be the total saliency at a given position $$A(i,j,k,l) = \{S_n S_n(i,j,k,l)\}$$

where N is the number of source images.

For appropriately selected constants a and b, $0 < a < b < 1$, let $$W_n(i,j,k,l) = 0$$

if $T_n < a$ $$W_n(i,j,k,l) = (s-a)/(b-a)$$

for $a < T_n < b$ $$W_n(i,j,k,l) = 1$$

for $b < T_n$ where
$$T_n = \{S_n(i,j,k,l)/A(i,j,k,l)\}$$

is the normalized saliency at the (i,j) position, $l^{th}$ orientation of the $k^{th}$ pyramid level for the $n^{th}$ source image.

This sigmoid like function accentuates the difference between weights of elements that have nearly average saliency while fixing the weights for a given element at near zero or near one if its salience is significantly below or above average, respectively.

The final step in forming the composite image $I_c$ is its reconstruction from its gradient pyramid representation $P_c$. The details of the computation of the inverse gradient pyramid transform are given in Appendix 1.

The invention is also apparatus for forming a composite image from a plurality of source images comprising means for transforming the source images into a feature-based representation by decomposing each source image $I_n$ into a set of component patterns $P_n(m)$ using a plurality of oriented functions; means for computing a saliency measure for each component pattern; means for forming the component patterns $P_c(m)$ of the composite image by assembling patterns from the source image pattern sets $P_n(m)$ guided by the saliency measures $S_n(m)$ associated with the various source images; and means for constructing the composite image through an inverse transform from its component patterns $P_c(m)$.

Apparatus for implementing the method of the invention is shown in FIGS. 5–8. The apparatus is shown in terms of two source images but it is understood that any number of source images can be used with appropriate modification of the apparatus.

The frame stores FS1 and FS2, if necessary, are used to convert input source images generated in an interlaced format to a progressive scan format for subsequent processing and to adjust timing. A television camera output is typically in interlaced format.

The combination of pyramid circuit P1 and frame store FS3 are used to compute the k-level Gaussian pyramid representation $G_a(k)$ of the input source image $I_a$ and the combination of circuit P2 and frame store FS4 are used to compute the n-level Gaussian pyramid representation $G_b(k)$ of the input source image $I_b$. The circuits P1 and P2 provide the low pass filter with a Gaussian rolloff and the pixel subsampling (removal/decimation of alternate pixels in each row and each row of the filtered image).

The next operation on each level of the Gaussian pyramids G(k) is a filter (1+w') which is performed by circuit P3 and circuit P4 to form $G_{df}(k)$ and $G(k)_{b'}$, respectively. The purpose of this pre-filter P3 and post-filter P8 are to adjust overall filter characteristics to provide an exact correspondence between intermediate results in the gradient pyramid transform and the Laplacian transform. Alternatively, this filter may be applied at other points in the sequence of transform steps. Other similar filters can be used to obtain approximate results. w' is a three by three binomial filter:

$$w' = (1/16) \begin{vmatrix} 1 & 2 & 1 \\ 2 & 4 & 2 \\ 1 & 2 & 1 \end{vmatrix}$$

And the filter P3 has the form:

$$1 + w' = (1/16) \begin{vmatrix} 1 & 2 & 1 \\ 2 & 20 & 2 \\ 1 & 2 & 1 \end{vmatrix}$$

Next, each of the filtered Gaussian pyramids $G_{af}(k)$ and $G_{bf}(k)$ is filtered with four oriented gradient filters representing the horizontal $d_h$, vertical $d_v$, right diagonal $d_{rd}$, and left diagonal $d_{ld}$ filters respectively.

$$d_h = |-1 \quad 1|$$

$$d_v = \begin{vmatrix} 1 \\ -1 \end{vmatrix}$$

$$d_{rd} = \begin{vmatrix} 0 & 1 \\ -1 & 0 \end{vmatrix} (1/\sqrt{2})$$

$$d_{ld} = \begin{vmatrix} 1 & 0 \\ 0 & -1 \end{vmatrix} (1/\sqrt{2})$$

These operations are performed by circuits P5 and P6, producing the eight oriented gradient pyramids $D_a(k,h)$, $D_a(k,rd)$, $D_a(k,v)$, $D_a(k,rd)$, $D_b(k,h)$, $D_b(k,rd)$, $D_b(k,v)$, $D_b(k,rd)$. It is to be understood that while the gradient operators shown here use only the two nearest neighbor samples in the particular direction, a larger number of neighbors can be used in the gradient calculation.

Figure 6:
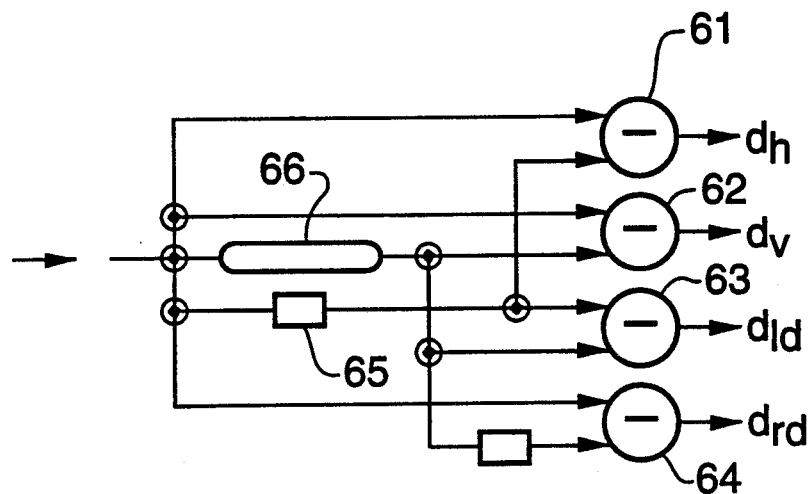
FIG. 6 is a schematic circuit diagram of the circuits P5 and P6.

In FIG. 6, circuits P5 and P6 comprise four subtractors 61, 62, 63 and 64. The input signal is connected directly to an input of subtractor 61 and through a single pixel delay 65 to the second input of subtractor 61. The output of subtractor 61 is $d_h$. The input signal is connected directly to an input of subtractor 62 and through a single line delay 66 to the second input of subtractor 62. The output of subtractor 62 is $d_v$. The input signal is connected through pixel delay 65 to an input of subtractor 63 and through line delay 66 to the second input of subtractor 63. The output of subtractor 61 is $d_{rd}$. The input signal is connected directly to an input of subtractor 64 and through line delay 66 and pixel delay 65 to the second input of subtractor 64. The output of subtractor 61 is $d_{ld}$. P5 and P6 can be implemented using a commercial Field Programmable Gate Array circuit (FPGA) such as XC3042 manufactured by Xilinx, Inc., San Jose, Calif. 95124.

Figure 8A:
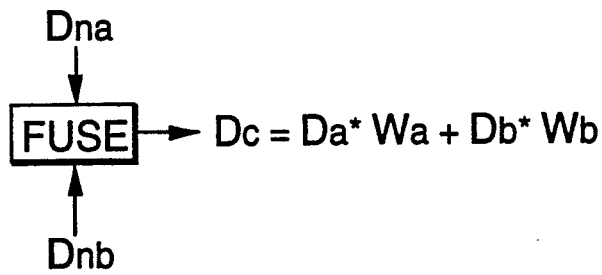
FIGS. 8(a), (c) and (d) are schematic diagrams of circuits implementing the weighting function.

The fusion function combines two or more images into a composite image as shown schematically in FIG. 8(a). Here the fusion function is computed on the four oriented gradient pyramids of the source images. It can also be applied to the Laplacian pyramid directly, but with less effectiveness.

Figure 8B:
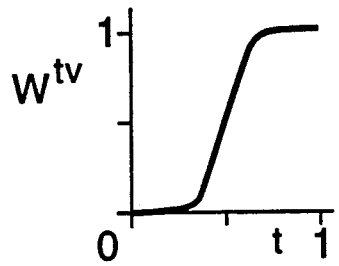
FIG. 8(b) is graphical illustration of a particular weighting function.
Figure 8C:
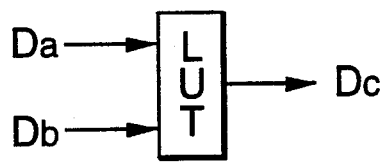

The functional dependence of $W_n$ on the total salience A for source image $I_n^a$ is shown in FIG. 8(b) for the case of two input images. The functions:

$$W_n(i,j,k,l) = 0$$

if $\{S_n(i,j,k,l)/A(i,j,k,l)\} < a$ $$W_n(i,j,k,l) = (s-a)/(b-a)$$

for $a < \{S_n(i,j,k,l)/A(i,j,k,l)\} < b$ $$W_n(i,j,k,l) = 1$$

for $b < \{S_n(i,j,k,l)/A(i,j,k,l)\}$ can be implemented with a single look-up-table (LUT) of size 64K×8 if the input and output images are 8 bits as illustrated in FIG. 8(c).

As examples, saliency may be based on absolute sample value or on a local root mean square average where $$S_n(i,j,k,l) = [S_{ij}w(i',j')D_n(i-i',j-j',k,l)^2]^{(\frac{1}{2})}.$$

Figure 8D:
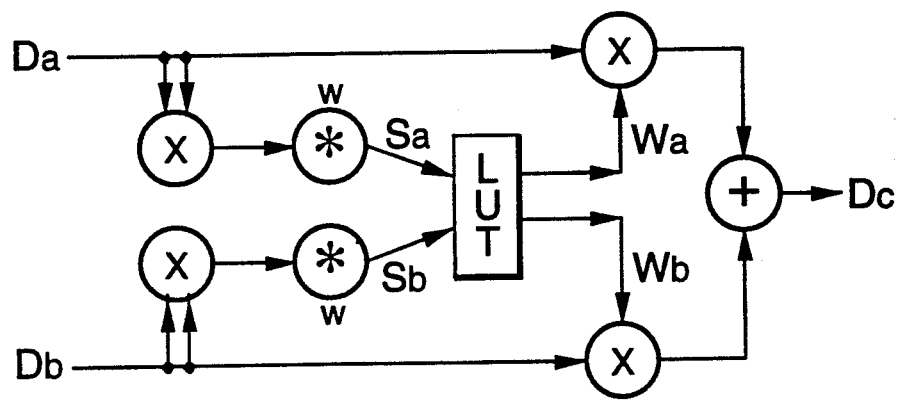

In FIG. 8(d) an implementation of the local average method is shown.

Subsequently, a weighted sum of the oriented gradient pyramids are computed in each of the orientations separately, resulting in the four composite oriented gradient pyramids $D_c(k,h)$, $D_c(k,rd)$, $D_c(k,v)$, $D_c(k,rd)$.

Figure 7:
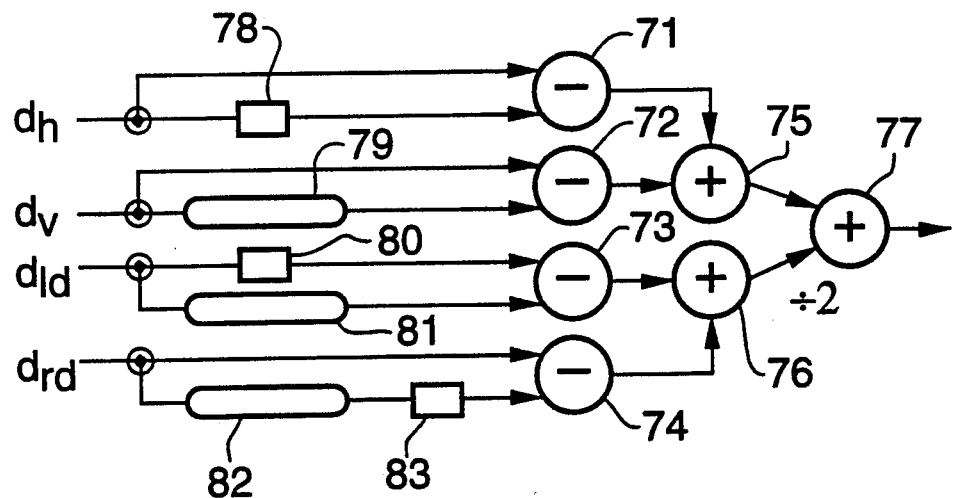
FIG. 7 is a schematic circuit diagram of the circuit P7.

The composite oriented gradient pyramids $D_c(k,h)$, $D_c(k,rd)$, $D_c(k,v)$, $D_c(k,rd)$ are then filtered again with the same four oriented gradient filters $d_h$, $d_v$, $d_{rd}$ and $d_{ld}$ and added to each other, resulting in the composite Laplacian pyramid $L_c(k)$. This computation is performed by circuit P7. In FIG. 7, circuit P7 comprises four subtractors 71, 72, 73 and 74 and three adders 75, 76 and 77. The input signal $d_h$ is connected directly to an input of subtractor 71 and through a single pixel delay 78 to the second input of subtractor 71. The input signal $d_v$ is connected directly to an input of subtractor 72 and through a single line delay 79 to the second input of subtractor 72. The input signal $d_{rd}$ is connected through a single pixel delay 80 to an input of subtractor 73 and through a single line delay 81 to the second input of subtractor 73. The input signal $d_{ld}$ is connected directly to an input of subtractor 74 and through a single line delay 82 and single pixel delay 83 to the second input of subtractor 74. The output of subtractors 71 and 72 are connected to the inputs of adder 75. The output of subtractors 73 and 74 are connected to the inputs of adder 76. The output of adder 75 and the output of adder 76 divided by two (2) are connected to the inputs of adder 77. The output of adder 77 goes to frame store FS5. P7 can be implemented using a commercial Field Programmable Gate Array circuit (FPGA) such as XC3042 manufactured by Xilinx, Inc., San Jose, Calif. 95124.

The composite Laplacian pyramid $L_c(k)$ is equivalent to the FSD Laplacian pyramid disclosed by Anderson et al, U.S. Pat. No. 4,692,806, and is stored in FS5. The pyramid $L_c(k)$ is then filtered by circuit P8 to produce $LF_c(k)$. The filter P8 has the form $(1+w)$ where w is a five by five binomial filter:

$$w = w' * w' = (1/256) \begin{vmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{vmatrix}$$

Figure 5:
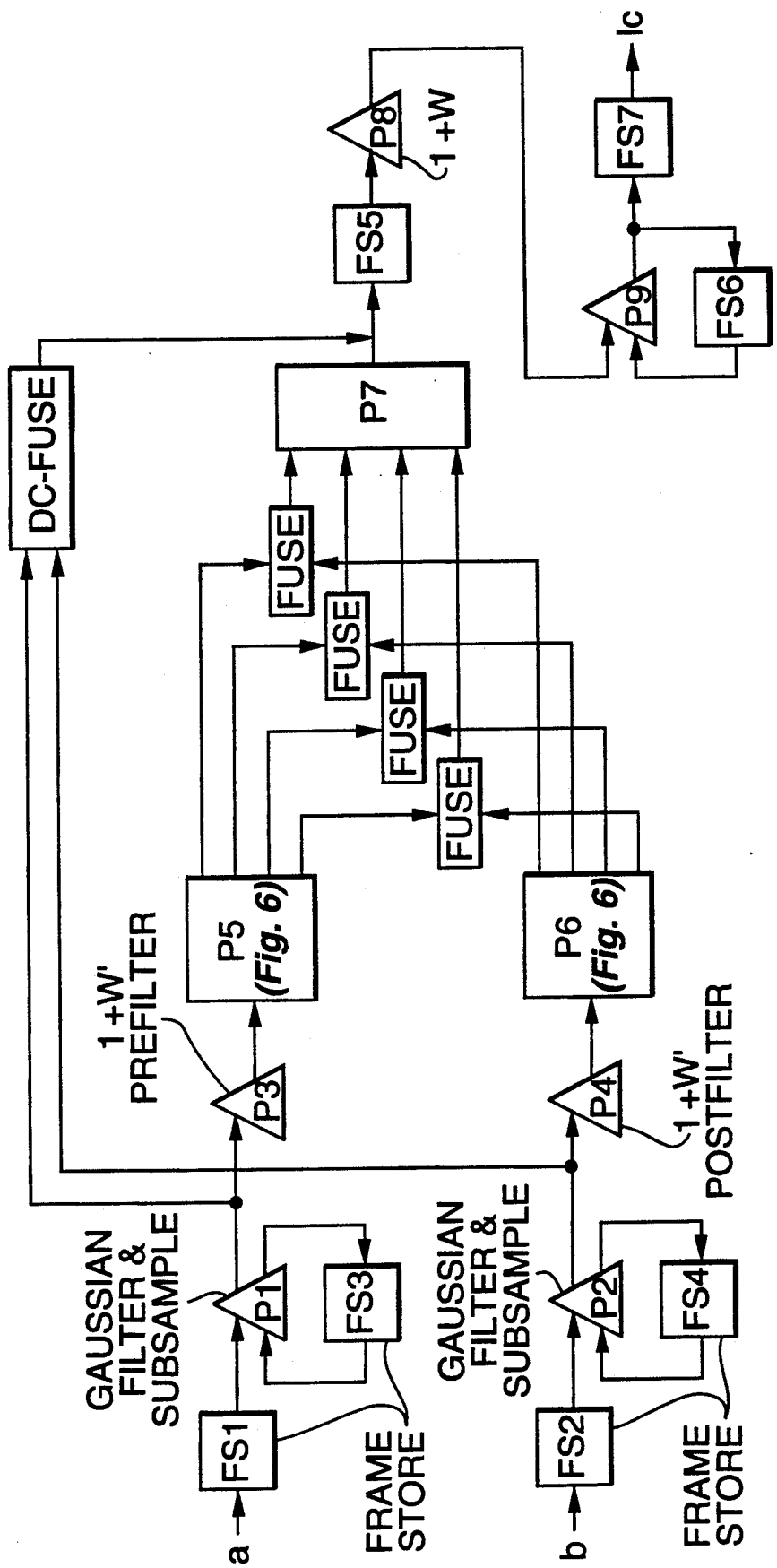
FIG. 5 illustrates the implementation of the method of the invention in real-time digital image processing hardware.

Notice that the $(1/\sqrt{2})$ factor in the diagonal gradient filters can be combined into a single $(1/2)$ factor in the diagonal components in the P7 processing function as shown in FIG. 5.

The composite image $I_c$ is reconstructed from the composite RE Laplacian pyramid $LF_c(k)$ using the combination of circuit P9 and frame store FS6 using the method described by Burt "Fast Filter Transforms For Image Processing", in Multiresolution Image Processing And Analysis, volume 16, pages 20–51, 1981 beginning with the lowest level of the pyramid. In FIG. 6 the circuit P9 is the same as P1 and P2. The process starts with the remainder $G_c(k)$, and computes the next higher resolution level $G_c(k-1)$ using the following function:

$$G_c(k-1) = LF_c(k-1) + w*G_c^e(k)$$

as shown in FIG. 4 where $G_c^e(k)$ is $G_c(k)$ expanded to the next pyramid resolution level by inserting zero valued samples between the given samples and filtering with w. The result $G_c(k-1)$ is stored in FS6. The next higher resolution level $G_c(k-2)$ is then computed in the same manner, combining $G_c^{e-1}(k-1)$ and $L_c(k-2)$. This process is repeated until $G_c(0)$ has been computed and stored in FS7. FS7 is used to adjust timing and to convert the composite image from progressive scan to an interlace scan format if that is required by the image display means to be used.

In detail, in the first processing pass (level 0) the source images $G_a(0)$ and $G_b(0)$ from the input frame stores FS1 and FS2, are filtered by the P1 and P2 functions and stored in FS3 and FS4 in subsampled form $G(0)^a$ and $G_b(0)$. At the same time, $G_a(0)$ and $G_b(0)$ are processed by circuits P3 through P7 and the four fusion circuits, producing $L_c(0)$ which is stored in FS5. When this operation is completed, the second processing pass (level 1) is started, where the images $G_a(1)$ and $G_a(1)$ (from FS3 and FS4) are filtered by circuits P1 and P2 and stored in FS3 and FS4 in subsampled form $G_a(2)$ and $G_b(2)$. At the same time, $G_a(1)$ and $G_b(1)$ are processed by circuits P3 through P7 and the four fusion circuits, producing $L_c(1)$ which is stored in FS5. This procedure is repeated until the required number of pyramid levels are computed. During the last pass (e.g. level k) the processing is different. Then the processing only involves reading $G_a(k)$ and $G_b(k)$ from FS3 and FS4, fusing the images with a different function, and storing the result $G_c(k)$ in FS5. This is the remainder or DC component, of the Laplacian pyramid $L_c(n)$. In FIG. 5, this is schematically shown as bypass paths around P3 through P7 and the fusion circuits. The fusion of the remainders (dc-fusion in FIG. 5) may be as simple as computing the average.

Many of the processing functions involve 2D filters. With 2D filters, the processing at the edge of the image may be undetermined. For large images this may not be a problem since discarding the edge data has little effect on the totality of the image. However, when constructing and reconstructing pyramids, the processing at the edges of the lower resolution levels of the pyramid affects the final reconstructed image to a significant extent. For example, if five levels of the pyramid are used, a border of 64 pixels around the image may not be reconstructed properly, if the computations at the edges of the images are not performed correctly. The reconstruction of a pixel includes information from the four pixels adjacent to the pixel of interest in a row. For an edge pixel, two of these adjacent pixels are missing and for the next adjacent pixel in the row, one of the adjacent pixels is missing. The simplest way to correct for this is to insert a constant value in to matrix of pixel values. Alternatively, the value of the missing pixels are set equal to the value of the pixel of interest. A preferred way to implement the edge processing would be to reflect or extrapolate the pixel data at the edges of the images. For example, at the left edge of an image the two pixels to the right of the edge pixel of interest are substituted for the missing pixels.

The construction and processing as described here can use a processor per function and per pyramid level, where the processors at each subsequent lower resolution operate at half the clock rate. A significantly more efficient implementation is to use one processor per function, where each processor computes or processes all pyramid levels in sequence as disclosed by van der Wal in U.S. patent application Ser. No. 07/805149, referred to above and incorporated herein by reference. This can be accomplished by using flexible frame stores (FS3, FS4 and FS5) for storing intermediate results, and adjusting the timing and/or processing clock to accommodate the additional processing time required. The processing of all pyramid levels by a single processor typically requires 4/3 times the number of operations required for processing one full resolution image. By using the blanking time of the input image efficiently, the actual clock rate does not have to be increased by much, if at all, to accommodate the increase in required processing.

For each input and output of the system, an interface frame store is shown in FIG. 5. These are FS1, FS2, and FS7. These are used to adjust for differences in timing between the fusion processing format and the input/output image format. One such difference is due to the timing required for the processing of the pyramid levels in sequence. Another difference may be that the image I/O is in interlace format, while the images during the fusion process may be computed using a progressive scan format.

Figure 9:
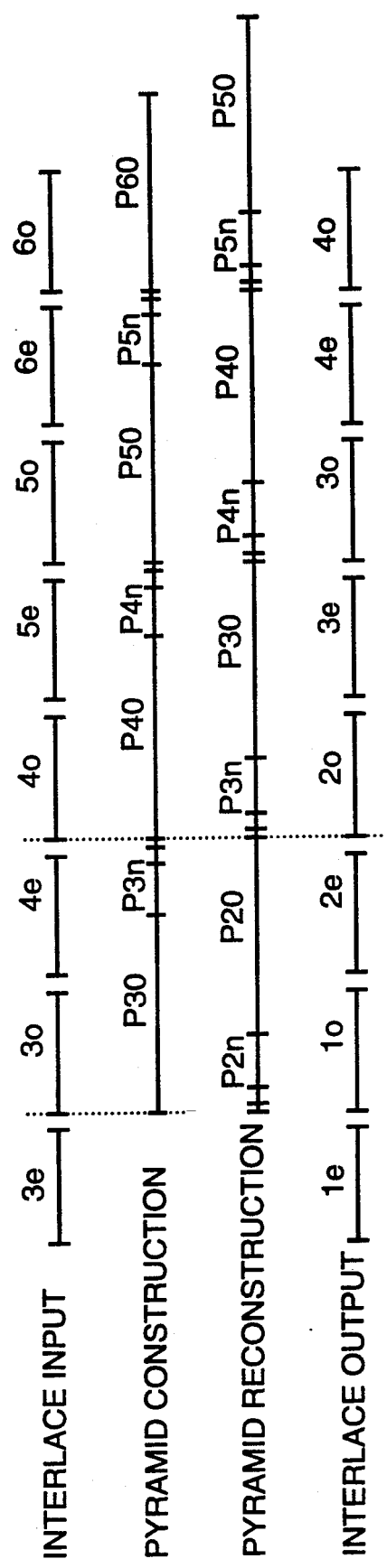
FIG. 9 is a timing diagram of when the various images and pyramid levels may be computed in a system with I/O frame stores, and assuming interlace I/O.

FIG. 9 is a timing diagram which shows when the various images and pyramid levels may be computed in a system with I/O frame stores, assuming interlace I/O for a sequence of images. The first time line is for successive interlaced frames having even and odd fields (e.g. 3e and 3o) spaced apart by the vertical blanking interval. The second time line shows the pyramid construction of the zeroth level gaussian of the pyramid for the 3rd frame which can begin as soon as the odd field of the frame is received. The computation of all levels of the 3rd frame pyramid must be completed before the pyramid construction of the zeroth level Gaussian of the 4th frame begins. The third time line shows the pyramid composite image reconstruction for the 3rd frame which begins at the same time that pyramid construction of the 4th frame begins. The formatted output of the 3rd frame begins at the same time that the 5th frame is received. Thus the entire cycle for a given frame can be accomplished in two frame times. If the clock rate of the processing needs to be slightly higher than the clock rate of the I/O, then first-in, first-out buffers may be used in combination with the I/O frame stores FS1, FS2 and FS7. An alternative to increasing the clock for the fusion processing is to reduce the image size on which the fusion processing is being performed.

Many of the processing functions in the implementation (P1, P2, P3, P4, P8, and P9) are 2D filters with $5 \times 5$ taps (P1, P2, P8, P9) or $3 \times 3$ taps (P3, P4). "Spread tap" versions of these filters used in double density pyramid construction can also be used. All of these are efficiently implemented using the PYR-1 circuit described by van der Wal in U.S. patent application Ser. No. 07/805149 filed Dec. 11, 1991, incorporated herein by reference, and in the Workshop For Machine Vision, Paris, December, 1991 and generally in U.S. Pat. No.

4,703,514, and sold by the David Sarnoff Research Center, Inc., Princeton, N.J. 08540. The PYR-1 circuit can implement all the required filters, includes the required horizontal line delays, the appropriate adders and multiplexing functions, and automatic border control of the images. Other 2D filter circuits are available commercially, but require significant additional circuitry to incorporate all the functions to implement the methods disclosed here.

Figure 10A:
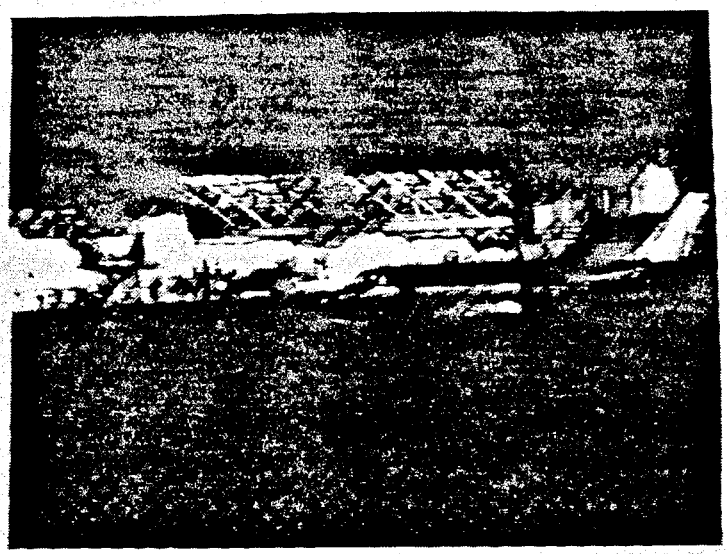
FIG. 10(a) is a photograph of a source image from a standard visible light camera.
Figure 10B:
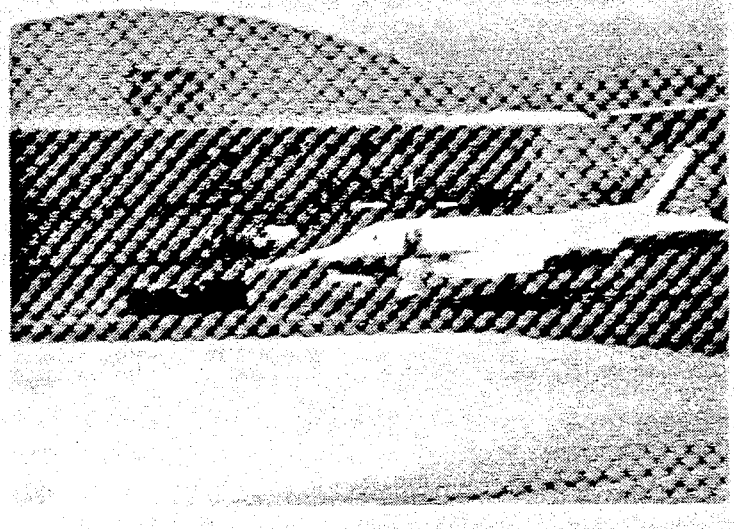
FIG. 10(b) is a photograph of a source image from an infrared camera.
Figure 10C:
FIG. 10(c) is a photograph of the fused image obtained using the method of the invention.

An example of a composite image formed from visible and infrared source images is shown in FIG. 10. The source image from a standard visible light camera is shown in FIG. 10(a), and the source image from an infrared cameras is shown in FIG. 10(b). The fused image, shown in FIG. 10(c), was obtained using the gradient pyramid and the saliency and combination rules outlined above.

The gradient image pyramid provides an effective framework for pattern-selective image fusion. Advantages of the pyramid transform for fusion include the fact that it decomposes images into regular arrays of edge-like component patterns (basis functions) through simple filter operations, and the fact that reconstruction blends pattern elements over scales, orientations, and positions in a seamless manner, avoiding artifacts. These advantages provide significantly improved image fusion compared to a process based upon the Laplacian pyramid.

Our results have shown that fusion within a gradient pyramid is remarkable effective over a wide range of viewing conditions. A particularly telling set of tests involved fusion of extended video sequences containing objects in motion. In these tests we compared gradient pyramid with Laplacian pyramid image fusion. Results with Laplacian-based fusion tended to have visible, dynamically changing, artifacts along high contrast contours. Results with the gradient pyramid were largely free of such artifacts.

The observed difference in performance can be attributed to several factors. Most important is the fact that the gradient representation has a local maximum in value at the location of an edge in the scene, while the Laplacian representation has zero value at the edge and large values either side of the edge. Since the amplitude of the sample value has been used as the measure of saliency in the present examples, edge features are more reliably captured with the gradient pyramid than with the Laplacian. Furthermore, noise in the video causes selection at some points in the scene to switch from one source image to the other from frame to frame. The resulting flicker is more visible in Laplacian than in gradient based fusion. Humans are most sensitive to temporal flicker of patterns with low spatial frequency content. The gradient-of-Gaussian basis functions of the gradient pyramid have a high band-pass characteristic with significantly less signal energy at low spatial frequencies than the Gaussian-like basis functions of the Laplacian pyramid.

Applications of the image fusion techniques disclosed herein include surveillance using images from multiple sensor types or spectral bands such as visible and IR cameras; vehicle guidance using multiple sensor types (visible, IR, ... ) as an aid to a driver or pilot at night or in bad weather; combining images taken with a camera's focus changed from image to image, to achieve a composite with an extended depth of field; video special effects using multiple images of difference scenes in order to obtain artistic or other special effects; industrial inspection where images taken under differing illumination and camera settings (speed, iris, etc.) are combined to eliminate shadows and highlights; and dynamic range compression for image display where a large dynamic range image (e.g., a 12 bit medical image) and a display that can render only a limited dynamic range (e.g., CRT or LCD) first generate a set of images that represent limited ranges of the original then combine these images through fusion for final display.

It is to be understood that the apparatus and method of operation taught herein are illustrative of the invention. Modifications may readily be devised by those skilled in the art without departing from the spirit or scope of the invention. The method disclosed here made use of edge-like pattern elements of many scales and orientations as the local scene features to be used in a composite image. Other directionally sensitive techniques for measuring features in an image can also be used in the method of the invention. It is also understood that methods other than pyramid processing methods and means for providing images of different scales can be used.

APPENDIX 1

The Gradient Pyramid Transform

A gradient pyramid for image I can be obtained by applying a gradient operator to each level of its Gaussian pyramid representation. The image can be completely represented by a set of four such gradient pyramids, one each for derivatives in horizontal, vertical, and the two diagonal directions.

Let $G_k$ be the $k^{th}$ level for the Gaussian pyramid for I. Then $G_0(i,j) = I(i,j)$ and, for $k>0$, $G_k = [w*G_{k-1}]_2$. Here w is the generating kernel, and the notation $[\ldots]_2$ indicates that the image array in brackets is subsampled (down sampled) by 2 in both the horizontal and vertical directions.

$D_{kl}$ is obtained from $G_k$ through convolution with a gradient filter $d_l$:

$$D_{kl} = d_l * [G_k + w' * G_k].$$

where $D_{kl}$ is the $k^{th}$ level of the pyramid and the $l^{th}$ orientation and w is a five by five binomial filter described above.

A method for reconstructing an image from its gradient pyramid representation comprises the steps of:

(a) converting each gradient pyramid level $D_{kl}$ to a corresponding second derivative pyramid (or oriented Laplacian) level $L_{kl}$ through a second application of the gradient filter $L_{kl} = -\{d_l * D_{kl}\}\{\frac{1}{8}\}$;

(b) summing the oriented Laplacians pyramids to form an FSD (filter-subtract-decimate) Laplacian pyramid, $L_k = S_{l=1}^4 L_{kl}$;

(c) converting the FSD Laplacian $L_k$ to an reduce-expand (RE) Laplacian $L_k = L_k + w*L_k$ through a filter convolution as disclosed by P. Burt, "Fast Filter Transforms For Image Processing", in Multiresolution Image Processing And Analysis, volume 16, pages 20-51, 1981; and (d) obtaining the reconstructed Gaussian G from the Reduce-Expand Laplacian through an interpolate and add procedure using all levels of the Reduce-Expand Laplacian, as well as the top level of the Gaussian: $G_N = G_N$ and for $k<N$, $G_k = L_k + 4w*[G_{k+1}]_{\neq 2}$. Where the notation $[\ldots]_{\neq 2}$ indicates that the image array in brackets is up sampled by inserting n−1 zero valued rows and columns between each row and column of the image.

Iterative application of this procedure yields G(0), the reconstructed version of the original image G(0).

APPENDIX 2

The Pyramid Circuit

The pyramid circuit accepts up to three digitized input signals and provides up to two output signals. The input and output data channels incorporate timing signals which control the pipelined processing. These timing signals are automatically adjusted to the processing delay of the circuit, allowing for automatic delay control in pipelined systems. The effective lengths of the horizontal delay lines used to implement a two-dimensional filter are controlled by the timing signals and, thus, do not need to be programmed. This circuit can accept and process signals having continuously variable horizontal and vertical blanking times. The circuit includes programmable edge control which can be used to separately extend the data at all edges of the image by two or four pixels.

The digital data signal may be generated from a sensor or from an analog to digital converter. For an image obtained from a video camera, the horizontal and vertical sync signals provide the timing signals. These signals are digitized in an auxiliary device such as a counter and then combined with the digital data signal to produce the input signal. Alternatively the digital data signal may be generated by a frame store in which case the timing signal is added by the frame store or an auxiliary device.

The two-dimensional filter used in the circuit has a separable kernel; it can be treated as a combination of separate horizontal and vertical filters. The five vertical and five horizontal filter coefficients are programmable within a limited set of values and may be either symmetric or antisymmetric. In addition, the filter may be configured to have either an odd or an even number of taps.

The circuit has two parallel paths which may be used to simultaneously calculate a Gaussian low-pass filtered image and a Laplacian function (the difference of the input image and the Gaussian) of the input image. The two parallel paths are also used for computing the inverse pyramid transforms.

Multiple pyramid circuits may be cascaded to implement multistep filters. Specially programmable delays and I/O functions allow a relatively large number of possible configurations to be implemented without external circuitry such as extra delay lines or timing circuitry. The circuit may be programmed to operate in a "spread-tap" mode. This causes the five-by-five tap filter to expand to an nine-by-nine tap filter by effectively inserting zero-valued coefficients between successive ones of the five horizontal and five vertical coefficients.

The circuit operates on eight-bit input images (signed or unsigned) and generates a sixteen-bit result. Two circuits can be connected in parallel so that sixteen-bit image data can be processed to produce a full sixteen-bit output signal.

Figure 11:
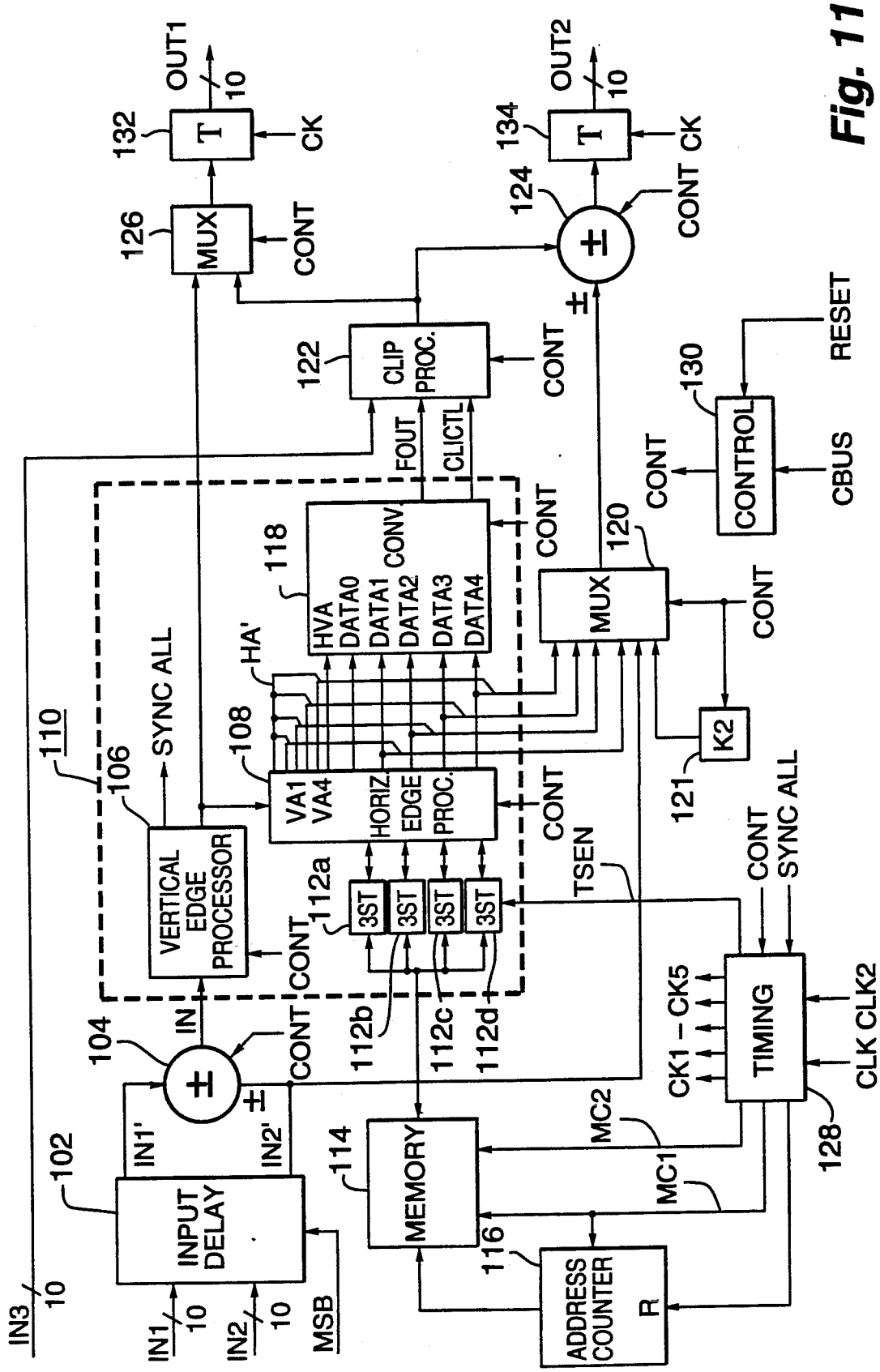
FIG. 11 is a block diagram of an exemplary pyramid circuit.

FIG. 11 is a block diagram of an exemplary pyramid circuit used for P1, P2, P7 and P9. The circuit is designed to function as an element of a multiresolution filter. The filter can accept up to three input signals, IN1, IN2 and IN3, and provide up to two output signals, OUT1 and OUT2. Each of these signals is a multi-bit digital signal containing at least eight data bits and two timing bits.

The two timing bits convey respective timing signals. One signal, HA, is in a logic high state when the data in a line is valid (i.e. during the active picture interval) and in a logic low state otherwise (i.e. during the horizontal blanking interval). The other signal, VA, is in a logic high state when the data in a field is valid and in a logic low state otherwise (i.e. during the vertical blanking interval).

The circuit shown in FIG. 11 includes five principal elements: an input arithmetic and logic unit (ALU) 104, a filter 110 (shown within the dashed line in FIG. 1), a multiplexer 120, a clip processor 122 and an output ALU 124. Signals IN1 and IN2, equally delayed by an input delay element 102 are combined by the ALU 104 to generate a signal, IN, for application to the filter 110. This signal may be one of the signals IN1 or IN2, or it may be their sum (IN1+IN2) or their difference (IN1−IN2).

The filter 110 processes the signal provided by the ALU 104 through a two dimensional filter which may be configured to have between one and five taps in each of its two dimensions. The filter includes a vertical edge processor 106 and a horizontal edge processor 108 which allow a variety of different types of pixel values to be implied as surrounding the actual image data. Among these are a constant value or a repeat of the first or last horizontal or vertical line. The processor 108 processes the input signals to effectively add lines of border pixels to the image at the top and bottom edges. In addition, it acts in concert with three-state gates 112a−112d and a memory 114 to implement a tapped delay line which is used to provide four line-delayed image signals to the vertical filter portion of the convolution processor 118.

A memory 114 provides a four or eight-line delay for the vertical portion of the two-dimensional filter. The delayed lines are combined both vertically and horizontally in the convolution processor 118 to complete the filter 110. The output signal provided by the filter 110 is processed by clip processor 122 which performs rounding and scaling for single precision signals and combines the filtered data as the more significant bit (MSB) positions with filtered data representing the less significant bit (LSB) portions, provided via input IN3, to generate double-precision output signals.

The output signal of the processor 122 or the output signal of the ALU 104, as processed by the processor 106, may be selected as the output signal OUT1. The output signal OUT2 may be the output signal of the clip processor 122 or the output signal of the multiplexer 120 or the output of the ALU 124 combining these two signals. The signal provided by the multiplexer 120 may be either a constant value, K2, the input signal IN2 or one of the delayed horizontal line signals provided by the horizontal edge processor 108. The multiplexer 120 includes internal compensating delays (not shown) which align each of the input signals to the signal provided by the clip processor 122. Timing signals for the circuit are generated by timing circuitry 128 which produces a two-phase memory clock and a system clock signal CK from a two phase input clock signal, CLK and CLK2.

The circuit functions are controlled via control circuitry 130 which accepts user commands from a control input channel CBUS and provides control signals and data values to the other components of the circuit via an output port CONT.

I claim:

1. A method for forming a composite image from N source images where N is greater than one comprising the steps of:
   (a) decomposing each source image $I_N$ into a plurality L of sets of oriented component patterns $P_N(m, L)$, where m is the number of patterns in each of the L sets for the $N^{th}$ source image;
   (b) computing a saliency measure $S_N(m, L)$ for each component pattern $P_N(m, L)$;
   (c) selecting component patterns from the component pattern sets $P_N(m, L)$ using the saliency measures $S_N(m, L)$ for each component pattern to form a set of oriented component patterns $P_c(m, L)$ of the composite image; and
   (d) constructing the composite image from the set of oriented component patterns $P_c(m, L)$.

2. The method of claim 1 further comprising the step of aligning the source images prior to step (a).

3. The method of claim 1 wherein the step of decomposing each source image $I_N$ into a plurality L of sets of oriented component patterns $P_N(m, L)$ comprises applying oriented operators to an image feature at each picture element of each source image.

4. The method of claim 3 wherein each oriented component pattern $P_N(m, L)$ is the gradient of the local image intensity at each picture element of each source image in a particular direction.

5. The method of claim 4 wherein the gradient operators are the first derivatives of the image intensity at each picture element in first and second orthogonal directions in each source image.

6. The method of claim 5 wherein the gradient operators also include the first derivatives of the image intensity in third and fourth directions in each source image which are orthogonal two one another and at a forty five degree angle to the first direction.

7. The method of claim 3 wherein the step of selecting component patterns from the source image pattern sets $P_N(m, L)$ for each value of m and L comprises selecting the component pattern having the greatest saliency.

8. The method of claim 7 wherein the step of selecting component patterns from the source image pattern sets $P_N(m, L)$ for each value of m and L comprises selecting the component pattern having the amplitude with the greatest absolute magnitude.

9. The method of claim 3 wherein the step of selecting component patterns from the source image pattern sets $P_N(m, L)$ for each value of m and L comprises selecting a linear combination of the amplitudes of the component patterns for each image.

10. The method of claim 9 wherein the linear combination of the amplitudes of the component patterns for each image is a weighted average of the amplitudes of the component patterns of the source images.

11. The method of claim 10 wherein the weight assigned to a particular component pattern in each of the source images depends upon the normalized saliency of the particular component pattern.

12. The method of claim 10 wherein the weighted average of the amplitudes of the component patterns is the weighted root mean square of the amplitudes of the particular component pattern and other components within a local neighborhood.

13. The method of claim 10 wherein the weight assigned to a particular component pattern in each of the source images is the weighted root means square of the amplitudes of the particular component pattern and other components within a local neighborhood.

14. The method of claim 1
   wherein step (a) further comprises the step of decomposing each source image into a plurality K of images $I_K$ of different resolution and then decomposing each of the images $I_K$ into a plurality L of sets of oriented component patterns $P_N(m, K, L)$;
   wherein step (b) comprises computing a saliency measure $S_N(m, K, L)$ for each component pattern $P_N(m, K L)$;
   wherein step (c) comprises computing component patterns from the source image component pattern sets $P_N(m, K, L)$ using the saliency measures $S_N(m, K L)$ for each component pattern to form a set of oriented component patterns $P_c(m, K, L)$ of the composite image; and
   wherein step (c) comprises constructing the composite image from the set of oriented component patterns $P_c(m, K, L)$.

15. The method of claim 14 wherein the step of decomposing each image $I_K$ into a plurality L of sets of oriented component patterns $P_N(m, K, L)$ comprises applying oriented operators to a feature of each picture element of each source image.

16. The method of claim 15 wherein each oriented component pattern $P_N(m, K, L)$ is the gradient of the local image intensity at each picture element of each source image in a particular direction.

17. The method of claim 16 wherein the gradient operators are the first derivatives of the image intensity at each picture element in first and second orthogonal directions in each source image.

18. The method of claim 17 wherein the gradient operators also include the first derivatives of the image intensity in third and fourth directions in each source image which are orthogonal two one another and at a forty five degree angle to the first direction.

19. The method of claim 14 wherein the step of selecting component patterns from the source image pattern sets $P_N(m, L)$ for each value of m and L comprises selecting a linear combination of the amplitudes of the component patterns for each image.

20. The method of claim 19 wherein the linear combination of the amplitudes of the component patterns for each image is a weighted average of the amplitudes of the component patterns of the source images.

21. The method of claim 20 wherein the weight assigned to a particular component pattern in each of the source images depends upon the normalized saliency of the particular component pattern.

22. The method of claim 20 wherein the weighted average of the amplitudes of the component patterns is the weighted root mean square of the amplitudes of the particular component pattern and other components within a local neighborhood.

23. The method of claim 1 wherein the step of decomposing each source image $I_N$ comprises forming two or more sets of wavelets oriented in different directions in each source image.

24. The method of claim 23 comprising first and second sets of wavelets in first and second orthogonal directions.

25. The method of claim 24 wherein the step of selecting component patterns from the source image pattern sets $P_N(m, L)$ for each value of m and L comprises selecting the component pattern having the greatest saliency.

26. The method of claim 24 wherein the step of selecting component patterns from the source image pattern sets $P_N(m, L)$ for each value of m and L comprises selecting a linear combination of the amplitudes of the component patterns for each image.

27. The method of claim 1
    wherein step (a) further comprises the step of decomposing each source image into a plurality K of images $I_K$ of different resolution and then decomposing each of the images $I_K$ into a plurality L of sets of oriented component patterns $P_N(m, K, L)$;
    wherein step (b) comprises computing a saliency measure $S_N(m, K, L)$ for each component pattern $P_N(m, K L)$ of each image N;
    wherein step (c) comprises computing component patterns from the source image component pattern sets $P_N(m, K, L)$ using the saliency measures $S_N(m, K L)$ for each component pattern to form a set of oriented component patterns $P_c(m, K, L)$ of the composite image; and
    wherein step (c) comprises constructing the composite image from the set of oriented component patterns $P_c(m, K, L)$.

28. A method for forming a composite image from N source images where N is greater than one comprising the steps of:
    (a) decomposing each source image into a plurality K of images $I_K$ of different resolution and then decomposing each of the images $I_K$ into a plurality L of sets of oriented component patterns $P_N(m, K, L)$, where m is the number of patterns in each of the L sets for the $N^{th}$ source image;
    (b) computing a saliency measure $S_N(m, K, L)$ for each component pattern $P_N(m, K, L)$ of each image N at each resolution level K;
    (c) selecting component patterns from the source image component pattern sets $P_N(m, K, L)$ using the saliency measures $S_N(m, K, L)$ for each component pattern to form a set of oriented component patterns $P_c(m, K, L)$ of the composite image; and
    (d) constructing the composite image from the set of oriented component patterns $P_c(m, K, L)$.

29. The method of claim 28 wherein the step of decomposing each source image $I_N$ into a plurality L of sets of oriented component patterns $P_N(m, L)$ comprises applying oriented operators to an image feature at each picture element of each source image.

30. The method of claim 29 wherein each oriented component pattern $P_N(m, L)$ is the gradient of the local image intensity at each picture element of each source image in a particular direction.

31. The method of claim 30 wherein the gradient operators are the first derivatives of the image intensity at each picture element in first and second orthogonal directions in each source image.

32. The method of claim 31 wherein the gradient operators also include the first derivatives of the image intensity in third and fourth directions in each source image which are orthogonal two one another and at a forty five degree angle to the first direction.

33. The method of claim 28 wherein the step of selecting component patterns from the source image pattern sets $P_N(m, K, L)$ for each value of m, K and L comprises selecting the component pattern having the greatest saliency.

34. The method of claim 33 wherein the step of selecting component patterns from the source image pattern sets $P_N(m, K, L)$ for each value of m, K and L comprises selecting the component pattern having the amplitude with the greatest absolute magnitude.

35. The method of claim 33 wherein the step of selecting component patterns from the source image pattern sets $P_N(m, K, L)$ for each value of m, K and L comprises selecting a linear combination of the amplitudes of the component patterns for each image.

36. The method of claim 35 wherein the linear combination of the amplitudes of the component patterns for each image is a weighted average of the amplitudes of the component patterns of the source images.

37. The method of claim 36 wherein the step of decomposing each source image $I_N$ comprises forming two or more sets of wavelets oriented in different directions in each source image.

38. The method of claim 37 comprising first and second sets of wavelets in first and second orthogonal directions.

39. Apparatus for forming a composite image from a plurality of N source images, where N is greater than one, comprising:
    means for decomposing each source image $I_N$ into a plurality L of sets of oriented component patterns $P_N(m, L)$, where m is the number of patterns in each of the L sets for the $N^{th}$ source image;
    means for computing a saliency measure $S_N(m, L)$ for each component pattern $P_N(m, L)$ connected to the decomposing means;
    means for selecting component patterns from the component pattern sets $P_N(m, L)$ using the saliency measures $S_N(m, L)$ for each component pattern to form a set of oriented component patterns $P_c(m, L)$ of the composite image; and
    means for constructing the composite image from the set of oriented component patterns $P_c(m, L)$.

40. The apparatus of claim 39 further comprising means for decomposing each source image into a plurality K of images $I_K$ of different resolution prior to the means for decomposing each source image.

41. The apparatus of claim 40 wherein the means for decomposing each source image $I_N$ comprises a electrical circuit for performing two different gradient operations on each of the source images $I_N$.

42. The apparatus of claim 39 wherein the means for computing a saliency measure $S_N(m, L)$ for each component pattern $P_N(m, L)$ includes electrical circuitry for calculating the weights for the different component patterns.

43. The apparatus of claim 39 wherein the means for computing a saliency measure $S_N(m, L)$ for each component pattern $P_N(m, L)$ comprises means for calculating the root mean square weight for the amplitudes different component patterns.

44. The apparatus of claim 41 wherein the means for constructing each composite image $I_N$ comprises a electrical circuit for performing the same two gradient operations on each set of composite patterns.

* * * * *